US008313717B2

(12) United States Patent
Boe

(10) Patent No.: US 8,313,717 B2
(45) Date of Patent: Nov. 20, 2012

(54) ATOMIZATION OF FLUIDS BY MUTUAL IMPINGEMENT OF FLUID STREAMS

(75) Inventor: Christian Boe, Farum (DK)

(73) Assignee: Grundfos NoNox A/S, Bjerringbro (DK)

( * ) Notice: Subject to any disclaimer, the term of this patent is extended or adjusted under 35 U.S.C. 154(b) by 1141 days.

(21) Appl. No.: 11/914,533

(22) PCT Filed: May 19, 2006

(86) PCT No.: PCT/DK2006/000272
§ 371 (c)(1),
(2), (4) Date: Jul. 8, 2008

(87) PCT Pub. No.: WO2006/122561
PCT Pub. Date: Nov. 23, 2006

(65) Prior Publication Data

US 2008/0311010 A1 Dec. 18, 2008

(30) Foreign Application Priority Data

May 20, 2005 (DK) .......................... PA 2005 00742

(51) Int. Cl.
*B01D 53/90* (2006.01)
*B05B 7/08* (2006.01)

(52) U.S. Cl. .......... 423/212; 60/295; 239/433; 422/168; 422/172; 423/239.1

(58) Field of Classification Search .................. 239/433, 239/418, 543; 422/172, 168; 423/212, 235, 423/239.1; 60/295
See application file for complete search history.

(56) References Cited

U.S. PATENT DOCUMENTS 2,235,258 A * 3/1941 Jones ........................... 239/544
2,785,926 A * 3/1957 Lataste ......................... 239/438
3,140,826 A * 7/1964 Kudelka ......................... 239/79
4,943,007 A 7/1990 Bowe et al.
5,911,851 A 6/1999 Bartels et al.
6,503,362 B1 1/2003 Bartels et al.
(Continued)

FOREIGN PATENT DOCUMENTS

CN 1370092 A 9/2002
(Continued)

OTHER PUBLICATIONS

Machine translation of JP 2003-239727, 10 pages.*

*Primary Examiner* — Jill Warden
*Assistant Examiner* — Joye L Woodard
(74) *Attorney, Agent, or Firm* — Knobbe Martens Olson & Bear LLP

(57) ABSTRACT

The present invention relates to the field of atomizing fluids. Some embodiments described herein relate to a nozzle for atomization of one fluid in an exhaust system of a combustion engine or gas turbine, the nozzle comprising an inlet and two or more outlets, arranged so that fluid streams discharged from the two or more outlets impinge at a distance from the two or more outlets so that the fluid streams discharged from at least two of the two or more outlets impinge each other at a specified angle in the range of 70° to 95° so as to provide a spray by atomization of the fluid. The fluid streams may e.g. have a cross section in the order of 0.005 to 0.05 $mm^2$ before impingement.

25 Claims, 9 Drawing Sheets

U.S. PATENT DOCUMENTS

| | | | |
|---|---|---|---|
| 2002/0108368 | A1 | 8/2002 | Hodgson |
| 2003/0079520 | A1 | 5/2003 | Ingalls, Jr. et al. |
| 2003/0213234 | A1 | 11/2003 | Funk et al. |

FOREIGN PATENT DOCUMENTS

| | | | | |
|---|---|---|---|---|
| DE | 102004056896 | | | 6/2006 |
| EP | 0 586 913 | A3 | | 8/1993 |
| EP | 0 331 343 | B1 | | 5/1994 |
| EP | 0864732 | A1 | | 9/1998 |
| EP | 1 331 373 | B1 | | 11/2005 |
| FR | 442 501 | | | 9/1912 |
| GB | 621785 | | | 4/1949 |
| JP | 01-281162 | | | 11/1989 |
| JP | 05-220426 | | | 8/1993 |
| JP | 05-92412 | | | 12/1993 |
| JP | 2002-522166 | | | 7/2002 |
| JP | 2003-239727 | | * | 8/2003 |
| JP | 2003-239727 | A | | 8/2003 |
| JP | 2004-33821 | A | | 2/2004 |
| JP | 2004-052688 | A | | 2/2004 |
| JP | 2004-132286 | | | 4/2004 |
| WO | WO 96/09090 | | | 3/1996 |
| WO | WO 98/28070 | | | 7/1998 |
| WO | WO 00/09074 | | | 2/2000 |
| WO | WO 2005/028119 | | * | 3/2005 |
| WO | WO 2006/056499 | A1 | | 6/2006 |

* cited by examiner

ATOMIZATION OF FLUIDS BY MUTUAL IMPINGEMENT OF FLUID STREAMS

CROSS REFERENCE TO RELATED APPLICATION

This application claims the benefit and priority to and is a U.S. National Phase of PCT International Application Number PCT/DK2006/000272, filed on May 19, 2006, designating the United States of America and published in the English language, which claims priority under 35 U.S.C. §119 to European Patent Application Number DK200500742 filed on May 20, 2005. The disclosures of the above-referenced applications are hereby expressly incorporated by reference in their entireties.

The present invention relates to atomization of fluids, and in particular to atomization of fluids discharged from a nozzle.

BACKGROUND OF THE INVENTION

Atomization of fluids is for instance carried out by mixing a fluid to be atomized with a gas. The use of a gas for atomization inevitably leads to introduction of this gas into the stream of atomized fluid, and in many practical implementations such a mix of fluids is highly undesirable. In connection with one of the aspects the present invention which relates to atomization of urea, atomization has previously been performed by use of pressurised air. In this connection it has been found that the presence of air will initiate growth of crystals which tend to block the flow passages. A further disadvantage is large air consumption.

SUMMARY OF THE INVENTION

An object of the present invention is to atomize one or more fluids, preferably liquids, being in the form of one or more fluid streams. This object has been met by various aspects and preferred embodiments of the invention by which one or more fluid streams flow so that impingement of the fluid stream(s) occur which impingement provides atomization of the fluid. By atomization is preferably meant that the fluid streams are decomposed into smaller units, such as droplets. The fluid streams may e.g. have a cross section in the order of 0.1 mm before impingement, and the resulting droplets after impingement between the fluid streams may have a cross section in the order of 0.01 mm. However, both smaller and larger values of the dimensions described are possible within the scope of the invention.

By fluid is preferably meant a liquid or a gas. However, embodiments according to the present invention may also be used to decompose solid particles into smaller particles. For such embodiments, “fluid stream” may be understood to include the meaning “a stream of solid particles” that are to be decomposed into smaller units.

The present invention relates in a first aspect to a method for atomization of one or more fluids, the method comprising leading pressurised fluid(s) through one or more outlets each having an orientation so that fluid streams discharged from the one or more outlets impinge at a distance from the one or more outlets so as to provide an atomization of the fluid. It should be noted that this wording also covers an outlet generating a fluid stream being conical and tapering in downstream direction so that the stream of fluid flowing through the outlet impinge.

Preferably, the one or more of the outlets are connected to a flow system comprising one or more shut off valves.

The fluid is preferably let through the one or more outlets intermittently, in a pulsating manner, in a continuously manner or a combination thereof. This has the advantage that amount of fluid atomized may easily be controlled.

In a preferred embodiment the intermittently and/or pulsating leading of fluid through the one or more outlets are provided by opening and closing the one or more shut off valves.

The fluid is preferably being let through the one or more outlets in a synchronised manner as this may assure impingement and thereby atomization.

Preferably, the fluid streams impinging one another have substantially the same kinetic energy as this may assure a spray of atomized fluid that is not lopsided. Additionally or in combination thereto, fluid streams impinging one another preferably have substantially the same mass flow and velocity.

In preferred embodiments of the invention, at least two fluid stream exiting the one or more outlets flow in one plane. This may provide a effective atomization as the fluid streams may impinge each other centrally.

The method according to the present invention may preferably comprise leading pressurised fluid selectively through some or all outlets of a plurality of outlets, such as four, five, six, seven, eight, nine, ten or more outlets, in such a manner that the amount of fluid atomized is varied by leading fluid through some or all of the outlets. Thereby control of the amount of fluid atomized may be controlled.

The one or more outlets are preferably arranged so that at least two atomized sprays are provided. The at least two sprays are preferably provided by the orientation of the outlets so that they travel in directions being either parallel or crossing.

In a particular preferred embodiment of the invention, the atomization is carried out in an exhaust system of a combustion engine, preferably being a diesel combustion engine or gas turbine and in this case the fluid to be atomized is preferably urea.

The atomization of the urea results in a better mixing of the urea with the exhaust gas than when the urea is supplied in other forms, such as in a stream or as larger droplets. The atomization means that the chemical reaction between the urea and the $NO_x$ gasses can be improved, and the discharge of $NO_x$ gasses to the environment can thereby be minimised.

The first aspect of the invention is advantageously carried out by one or more nozzles according to the second aspect of the invention.

The present invention relates in a second aspect to a nozzle for atomization of one or more fluid streams, said nozzle comprising an inlet and one or more outlets, said one or more outlets being arranged so that fluid stream(s) discharged from the one or more outlets impinge. It should be noted that also this wording covers an outlet generating a fluid stream being conical and tapering in downstream direction so that the streams of fluid flowing through the outlets impinge. The fluid streams may be supplied from one or more fluid lines, and one or more of the fluids may be pressurized. It may be an additional purpose of the impingement between the fluid streams that they are mixed during or after atomization.

According to preferred embodiments, the nozzle may comprise at least two outlets being arranged so that fluid streams discharged from one of the outlets impinges with fluid streams discharged from another of the outlets. Alternatively, the nozzle may comprise at least three, such as at least four, such as at least five outlets, such as at least six outlets.

All outlets are preferably connected to the inlet by intermediate flow channels dividing and leading the fluid entering the nozzle to the outlet. Preferably, the intermediate flow channels lead and divide the fluid to the outlets in a substantially uniform manner.

The cross sections of the flow channels may have any shape, such as circular or quadratic. Furthermore the cross section may be the same along the whole flow path, or it may vary in shape and/or size. The cross section of the flow channels may be designed to establish a build up of the pressure in the fluid by having a larger total flow channel cross section area at the inlet of the nozzle than at the exit end.

The outlets are preferably arranged so that fluid streams discharged from at least two outlets impinge each other at an angle of between 30 and 100°, such as between 70 and 95°, preferably 90°. However, all angles that ensure impingement of the fluid streams are possible within the scope of the invention. The angles may be the same for all outlet flow channels of a nozzle, but the outlet flow channels may also be arranged so that some fluid streams impinge at one angle and others impinge at least one more angle. Furthermore the angles may be fixed or variable, with a variable angle e.g. being established by letting the nozzle comprise closing means whereby some of the outlet flow channels can be blocked.

The one or more of the outlets are preferably defined by the termination of a bore defining an outlet flow channel being in fluid communication with the inlet. These outlet channels may preferably be connected to the inlet by the intermediate flow channels or to a cavity of the nozzle, the cavity being in fluid communication with the inlet channel.

Preferably, the cross sectional area of the fluid streams discharged from the outlets is in the range of 0.005 to 0.05 $mm^2$, such as in the range of 0.01 to 0.03 $mm^2$, preferably 0.02 $mm^2$.

In a preferred embodiment, the nozzle comprises at least four outlets wherein two of the outlets are arranged so that fluid discharged there from impinges at a first angle and wherein two other outlets are arranged so that fluid discharged there from impinges at a second angle, the first and the second angles being different from each other. However, the nozzle may comprise any number of outlet flow channels arranged so that the fluid streams discharged there from impinge pair wise, or in groups of three or more, at any number of angles.

In another preferred embodiment, the one or more outlets comprise(s) a slot arranged so that the fluid exiting the nozzle will exit in a fluid stream having conical shape tapering in the stream wise direction. The slot may be provided as a conical bore and a corresponding conical member arranged within the bore. The conical member may be adjustably arranged so that the longitudinal position of the member can be adjusted whereby the size of the slot can be adjusted. This provides the possibility of adjusting the amount of fluid exiting the nozzle. The member may furthermore comprise additional outlet flow channels.

Preferably, the nozzle according to the present invention may comprise filtering and/or heating means. These means may be used to filter and/or heat one or more fluids being led through the nozzle.

The nozzle according to the present invention may further comprise one or more valve means. Such valve means may be adapted to shut off the flow through one or more of the outlets so as to control the amount of fluid being atomized and/or to fully shut off for fluid flow through the nozzle. Hereby a pulsating and/or intermittently flow through the nozzle may be provided.

In accordance with a third aspect of the present invention, a system for mixing liquid urea with the exhaust gasses from a combustion engine or gas turbine is provided. In embodiments according to this aspect, the urea is added and atomized within the exhaust gasses by use of a nozzle as described above.

In an embodiment of the invention, the nozzle may be arranged in the centre of a pipe of an exhaust system of a combustion engine or gas turbine. In another embodiment, a plurality of nozzles may be circumferentially distributed along the wall of a pipe of an exhaust system of a combustion engine. The one or more nozzle may be arranged so as to deliver atomized fluid in the stream wise or in any other direction of the exhaust gasses such as perpendicular to the stream wise direction. The one or more nozzles may be placed at any position with respect to the pipe of an exhaust system within the scope of the invention.

BRIEF DESCRIPTION OF THE DRAWINGS

In the following, preferred embodiments of the present invention will be disclosed in details in connection with the accompanying figures in which.

DETAILED DESCRIPTION OF PREFERRED EMBODIMENTS

Figure 1:
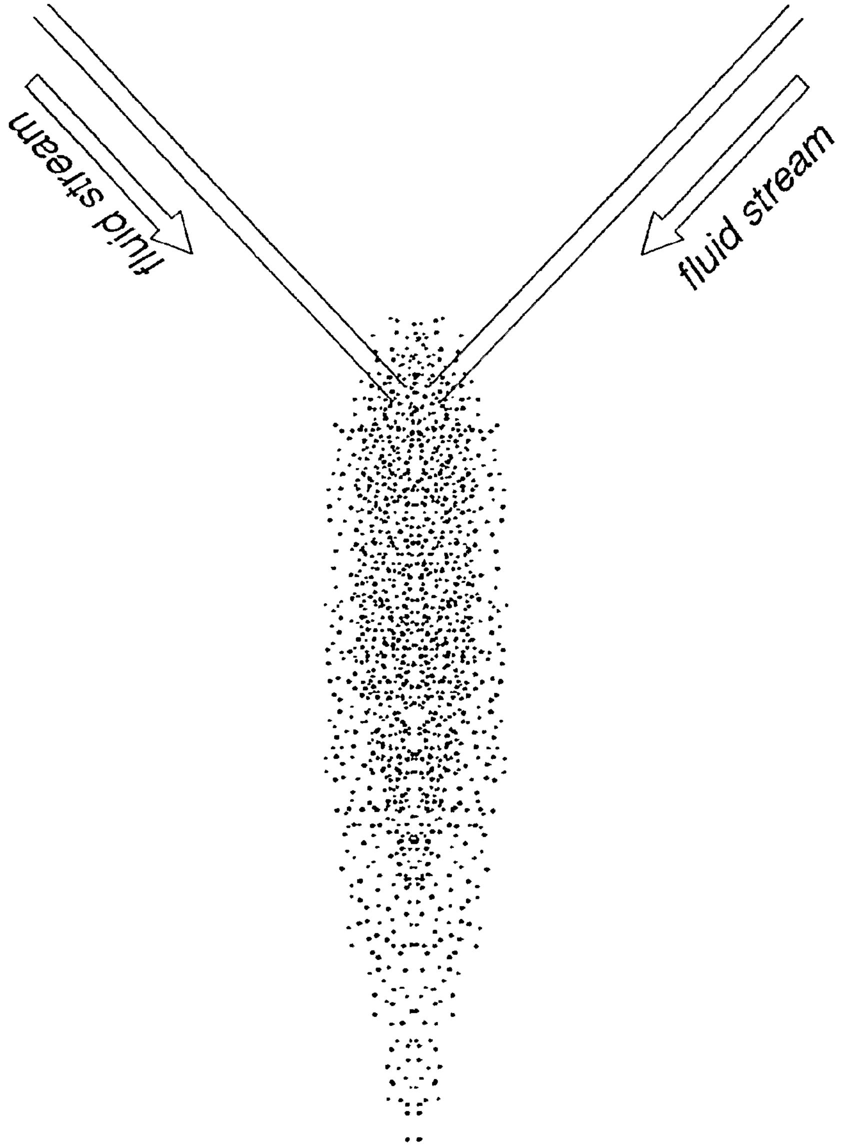
FIG. 1 shows schematically the overall principle of atomizing a fluid by letting two streams of fluid impinge.

FIG. 1 shows schematically the overall principle of atomizing a fluid by letting two streams of fluid impinge. According to the overall principle the fluid is divided in a number of streams—in the example shown in FIG. 1 into two streams—each given kinetic energy. The amount of kinetic energy given to streams is so that when the streams impinge at conditions where substantial opposite directed velocity components of the streams exist the streams will break up into a spray having a small droplet size shown as dots in the figures. This is in the present context referred to atomizing. It is essential to the atomizing process that each stream of fluid "hits" each other centrally, e.g. in the example of FIG. 1 that the two streams of fluid is within the plane, if one aims at providing a best possible atomization. Furthermore, a balance between the streams' mass flow and velocity should be present to provide a spray that is not lopsided.

The magnitude of the opposite directed velocity components depends among other factors on the angle between the fluid streams. If the angle is small, e.g. 60°, the atomization of the fluid stream is lesser and the resulting spray will have a substantial velocity in the direction of the vector sum of the fluid streams velocities. If the angle is large, e.g. 120°, small droplets are hurled upstream the direction the fluid stream—this is indicated in FIG. 1. In case the fluid streams are provided by a nozzle the hurling back of droplets may result in depositing of fluid on the nozzle as fluid film and/or droplets.

Figure 2:
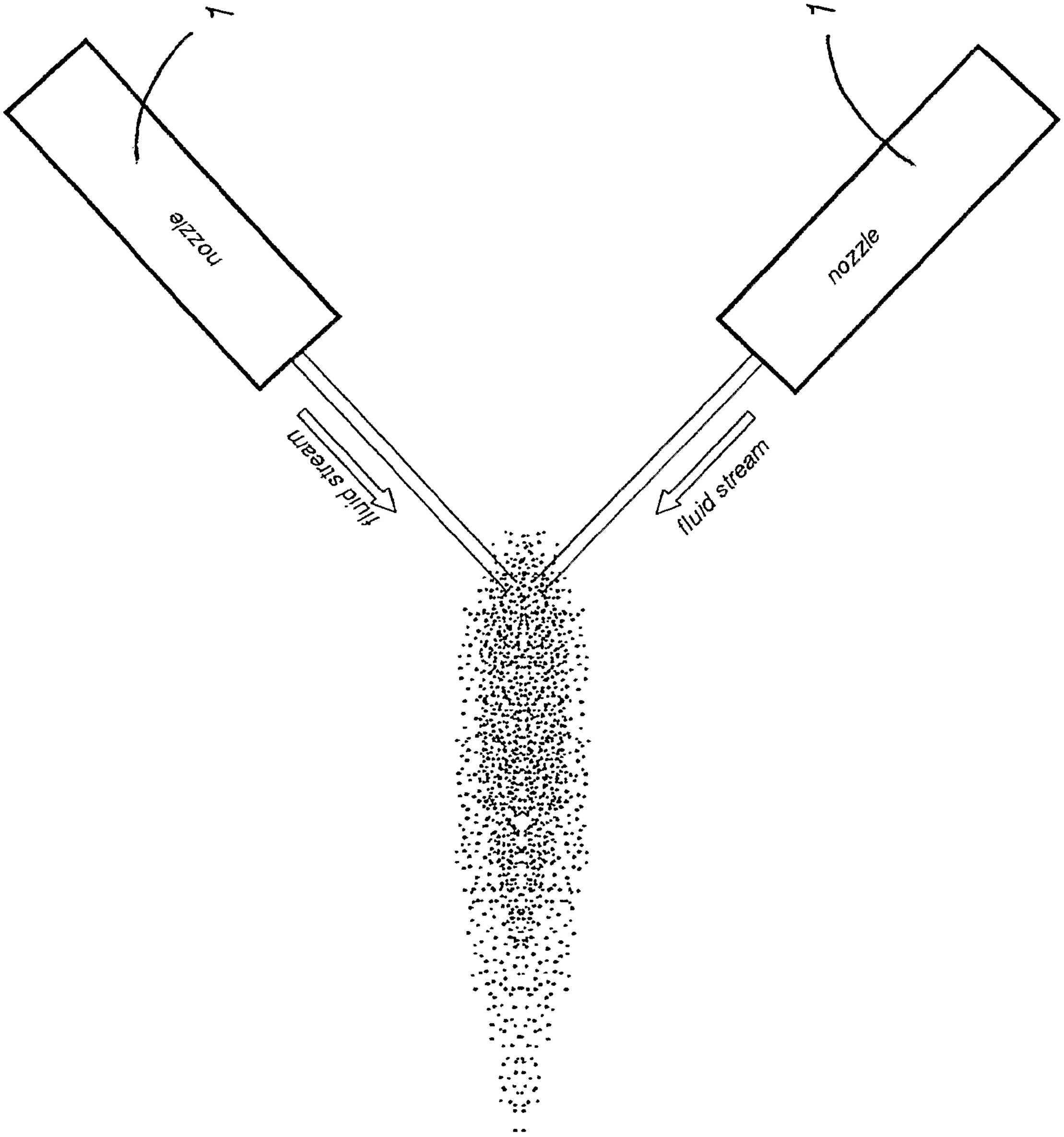
FIG. 2 shows schematically an embodiment of the present invention in which two impinging streams of fluid are provided by two separate nozzles.

FIG. 2 shows schematically the scenario disclosed in connection with FIG. 1 where the two fluid streams are provided by two separate but similar, such as identical, nozzles 1. The two nozzles are supplied with fluid from one pressurised source (not shown) whereby it is easier to guarantee that the two nozzles 1 provide fluid streams having similar, such as equal, mass flow with similar, such as equal velocity.

Figure 3:
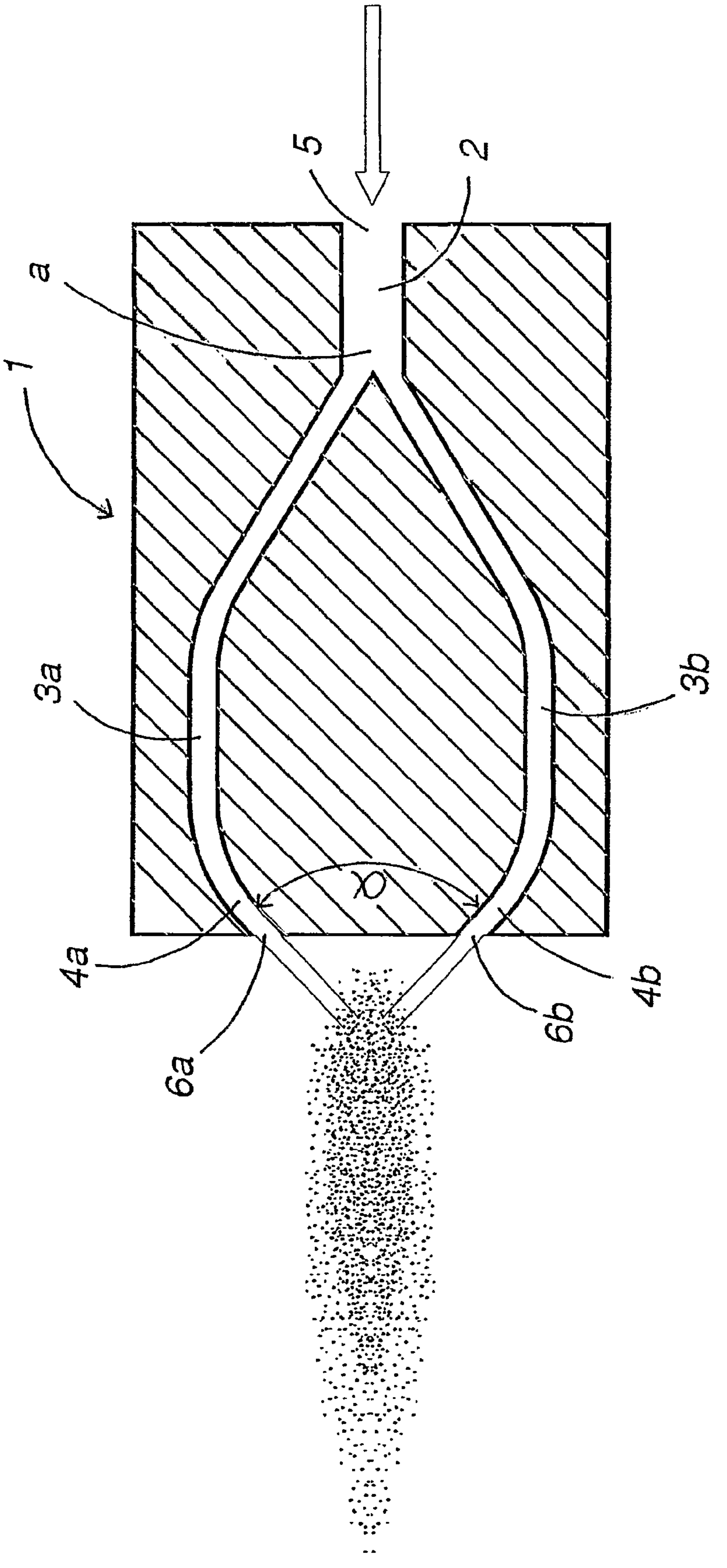
FIG. 3 shows schematically a cross sectional view of an embodiment of the present invention in which two impinging streams of fluid are provided by a single nozzle FIGS. 4*a* and *b* shows schematically two streams impinging fluid streams during intermittent flow conditions.

FIG. 3 shows schematically the overall principle of atomizing a fluid by leading the flow of fluid through two channels arranged so that the exiting fluid streams impinge on one another whereby the fluid is atomized. The fluid is illustrated as being supplied from one fluid line, which typically is pressurized. However, the invention may also be used to atomize and at the same time mix two or more different fluids led to the nozzle from different fluid supplies.

With reference to FIG. 3 the nozzle 1 comprises an inlet channel 2 through which the fluid to be atomized is fed into the nozzle 1. The inlet channel 2 bifurcate at position a in FIG. 3 into two intermediate flow channels 3*a* and 3*b* leading the fluid into two distinct outlet flow channels 4*a* and 4*b*. The channels 2, 3 and 4 constitute flow channels defining a flow path from the inlet 5 of the nozzle 1 to the outlets 6*a* and 6*b* of the nozzle. As shown in FIG. 3 the outlet flow channels 4*a* and 4*b* are continuations of the intermediate flow channels 3*a* and 3*b*. The outlet flow channels 4*a* and 4*b* are according to the present invention, in general, defined as flow channels providing the streams of fluid directions so as to impinge each other.

As discussed above, a balance between the two fluid streams should exist in order to provide a spray not being lopsided. In order to assure that in embodiments like the one disclosed in FIG. 3, the flow resistance between the bifurcation point a and the outlets 6*a* and 6*b* and the dimensions thereof respectively is made equally big for the two flow paths. Hereby, the velocity and mass flow for the two fluid streams will become similar, such as equal.

Fluid exiting the outlets 6*a* and 6*b* is indicated in FIG. 3 with thin lines and it is indicated that the fluid impinges at a distance from the nozzle which impingement results in an atomization as indicated by a fan shaped dotted cloud extending mainly in the down stream direction.

The cross sections of the flow channels within the nozzle may have any shape which may be related to the actual manufacturing process used for making the nozzle. The cross section is preferably circular and the dimensions mentioned in the following then refer to the diameter of the cross section. For other shapes the dimensions refer to a characteristic measure, such as the side length of a quadratic cross section.

The dimensions of the flow channels 2, 3 and 4 are chosen according to the actual use of the nozzle and thereby the amount of fluid to be atomized. In a typical embodiment the cross sections of the channels are circular with a diameter in the order of 0.1 mm. However, the amount of fluid exiting the nozzle will to a large extent be determined by the size of the outlets 6*a* and 6*b* and the pressure difference across the outlets 6*a* and 6*b*. It is therefore envisaged, that the channels 2, 3 and 4 may have a larger cross section than the outlet and provide an amount of fluid to be atomized being determined by the pressure difference across the outlets 6*a* and 6*b* and the cross sectional area thereof.

Figure 4B:
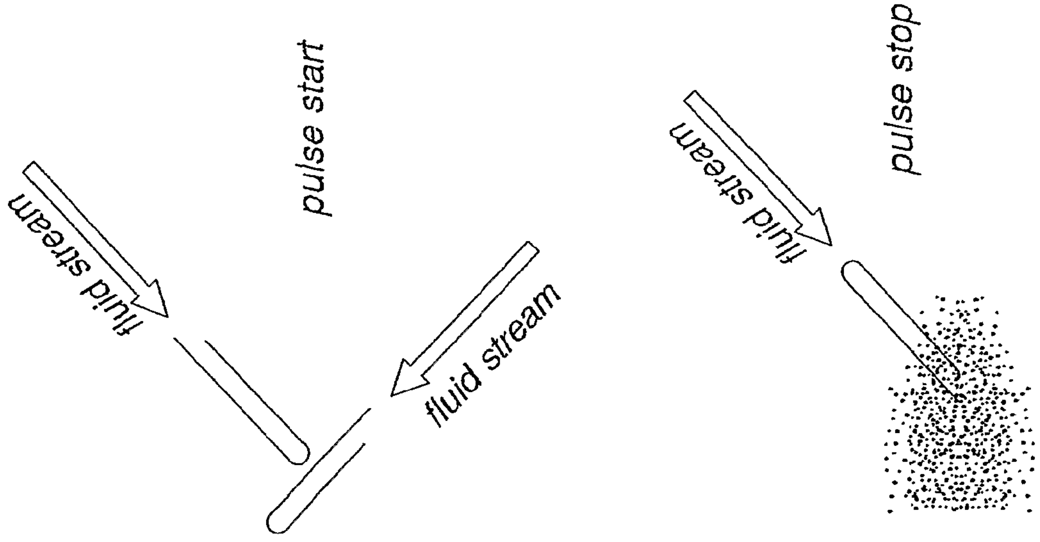
Figure 4A:
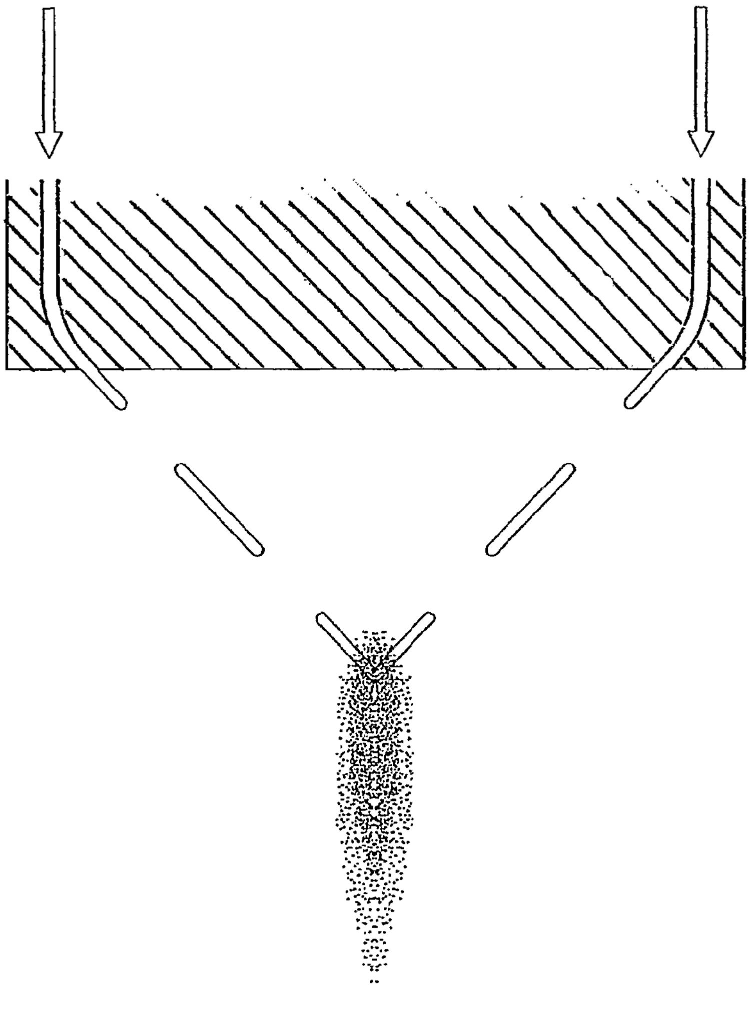

The fluid streams impinging should as discussed above have sufficient kinetic energy in order to be atomized. In some applications of the present invention, the mass flow being atomized will typically vary at least an order of magnitude such that the minimum mass flow may be as low as 1% of the maximum mass flow. At low mass flow the kinetic energy may be so small that no or only very little atomization occurs. In particular, in case a mass flow of 1% of maximum was supplied continuously to the nozzle the amount of energy per mass unit present in the fluid streams would be less than 0.01% of the amount of energy present in the fluid streams at maximum mass flow. Such a small amount of energy would be insufficient to atomize the fluid. The problem has been solved by the present invention by providing synchronic fluid streams with high flow velocity only intermittently (see FIG. 4). In such cases it may not be sufficient that the flow resistance between the bifurcation point a and the outlets 6*a* and 6*b* and the dimensions thereof respectively is made equally big for the two flow paths. In order to avoid formation of large droplets at start and stop of a pulse of fluid stream one should furthermore seek to assure that the mass of the two fluid strings being confined e.g. between the bifurcation point a and the outlets 6*a* and 6*b* (see FIG. 3) are similar, such as identical. If not, one of the fluid strings may accelerate and decelerate faster than the other(s) and a situation as shown in FIG. 4*b* where one end of a fluid string is not hit by another fluid string may occur.

In some embodiments, one or more nozzle according to the present invention is connected to a pressurised source of fluid via a valve, typically a magnetic valve. Alternatively the valve is included in the nozzle. The flow path between the source and the outlets of the nozzle(s) are in general not ideally stiff due to elasticity in pipes, fitting, sealings etc. and small gas bubble present in the flow path. If the elasticity is too big for instance due to soft connections and larger gas bubbles, the pressure in the flow path will decrease too slowly at closing off the fluid flow and fluid will continue to flow but with a too small kinetic energy to provide an atomization which will result in generation of droplet on the surface of the nozzle close to the outlets of the nozzle. If the elasticity is larger the flow will stop rapidly and an underpressure be created by deceleration which will be able to suck a fluid accumulated outside the nozzle back into the nozzle so that formation of droplets is avoided.

Figure 8:
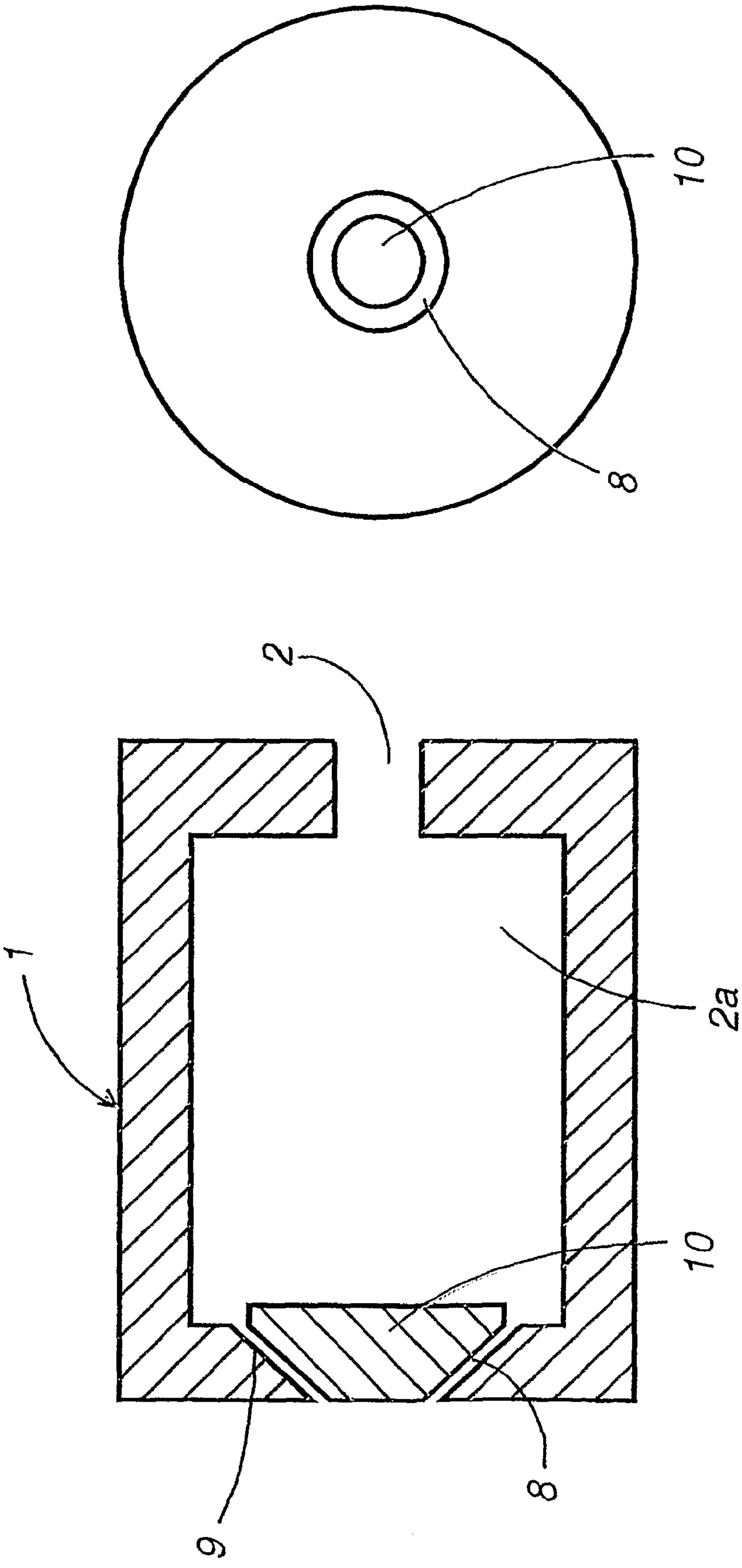
FIG. 8 shows schematically an embodiment of the invention in which the outlet is provided as an annular slot.

Alternatively to the embodiment shown in FIG. 1, the inlet channel 2 may instead of comprising the bifurcation point be made up by of a cavity within the nozzle being in fluid communication with the inlet 5 via an inlet channel similar to the one shown in FIG. 3. An example of such a cavity 2*a* is illustrated in FIG. 8. The cavity is also in fluid communication with outlet flow channels similar to the ones shown in FIG. 3.

In one embodiment of the invention the flow channels are provided in one solid block of material. In another embodiment the flow channels are established by joining two or more members of which one or more contain(s) grooves which constitute the channels.

The nozzle may e.g. be made from steel, aluminium, plastic or ceramic depending on the actual use, and any type of material is possible within the scope of the invention. The choice of material will depend on a number of parameters including the operation temperature of the nozzle, the manufacturing technology used for manufacturing the nozzle, the chemical resistance against the fluid, and the flow rate and thereby the resulting wear rate.

The point where the fluid streams impinge is at least determined by two factors, namely the distance between the outlets 6*a* and 6*b* in FIG. 3 and the angle α in FIG. 3. When the outlet flow channels are cylindrical in shape this angle will typically correspond to the angles between the axes of symmetry of the respective outlet flow channels. However, the outlet flow channels may also have varying cross sections along the flow path, such as being conical either with an increasing or decreasing cross sectional area in the stream wise direction. When the cross section of an outlet flow channel is circular, its diameter will correspond to the diameter of a fluid stream being discharged there from. However, when a flow channel is conical, the diameter at the end of the outlet flow channel will differ from a fluid stream being discharged there from.

In FIG. 3 the angle, α, between the outlet flow channels 4 is illustrated as being approximately 90° but other angles, such as 30°, 60° or 120°, may also be used. The angles may be either acute or obtuse. Furthermore the angles may be either fixed or variable. Variable angles may e.g. be obtained by letting the nozzle 1 comprise outlet flow channels 4 with different angles and furthermore comprise closing means (not shown) that can be used to block some of the channels.

The nozzle 1 may additionally comprise other means (not shown), such as filtering means and/or heating means for heating the fluid. The purpose of such heating may be to improve the atomization but it may also be related to an actual use of the fluid. It may e.g. be desired to heat the fluid if that improves a chemical process between the fluid and another component, such as a gas or liquid.

Figure 7:
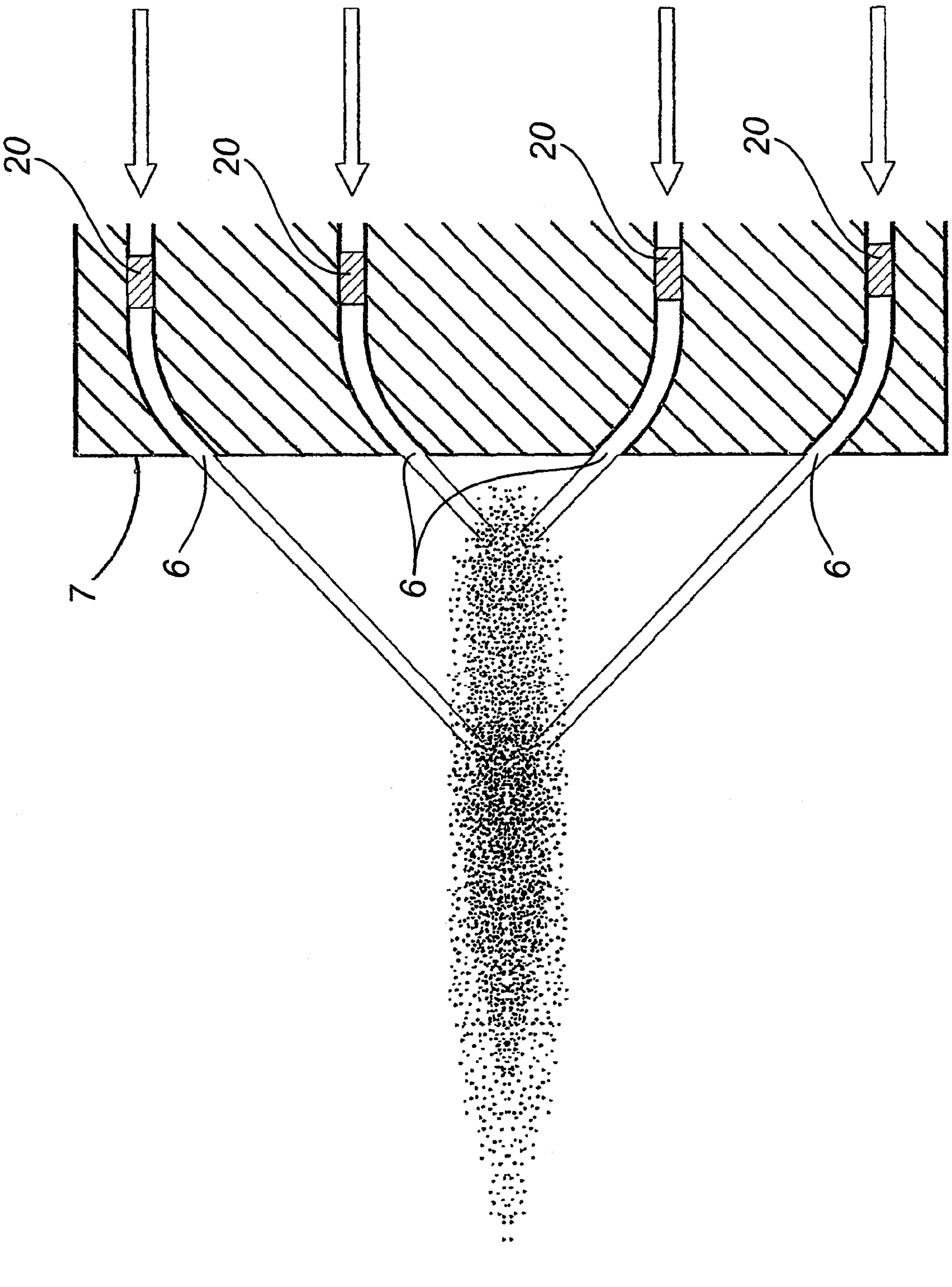
FIG. 7 shows schematically an embodiment of the invention in which the fluid streams impinge at different distances from the outlet end surface of the nozzle.

Furthermore, the nozzle 1 may comprise one or more valves—or the fluid fed to the nozzle being fed through one or more valves 20—adapted to shut off flow through one or more of the outlets 6. In the embodiment shown in FIG. 7 comprising a first set of outlets adapted to atomize fluid at a first distance from the nozzle and a second set of outlets adapted to atomize fluid at a second distance from the nozzle, the valve(s) 20 may be adapted to shut off flow through one of the sets of outlets independently of flow through the other set of outlets. Thereby the amount of fluid being atomized can easily be controlled.

The amount of fluid being atomized can also be controlled by operating the valve(s) to provide a pulsating flow of fluid and/or by feeding the fluid intermittently through the nozzle. This can be done by successively opening and closing the valve(s) so as to successively allow and prevent fluid to flow through the nozzle. Pulsating will in many cases requires that the valve(s) is not fully closed. Such a controlling is particular useful when small amounts of fluid are to be atomized as such a pulsation will generate fluid streams of sufficient strength so that the impingement will result in atomization (see also the previous discussion of this issue above). This can advantageously be exploited in cases where the nozzle is operating in conditions where the demand for atomized fluid is not constant, and in such cases large amounts of atomized fluid can be provided by keeping the valve(s) open and small amounts of atomized fluid can be provided by successively opening and closing the valve(s).

As discussed above, when an intermittently flow condition is used, it must be ensured that the fluids from different outlet flow channels 4 still impinge. If the flow channels 3, 4 through which fluids that are to impinge are led have the same cross sectional dimensions, impingement can e.g. be ensured by having the same lengths of these flow channels 3, 4. However, it may be desired to have different lengths of flow channels 3, 4 through which fluids that are to impinge are led. Impingement can then be ensured by choosing appropriate cross sectional dimensions. Different lengths of flow channels 3, 4 may e.g. be desired when two different fluids are to impinge of which one of the fluids is to be heated while passing through the flow channel.

Figure 5:
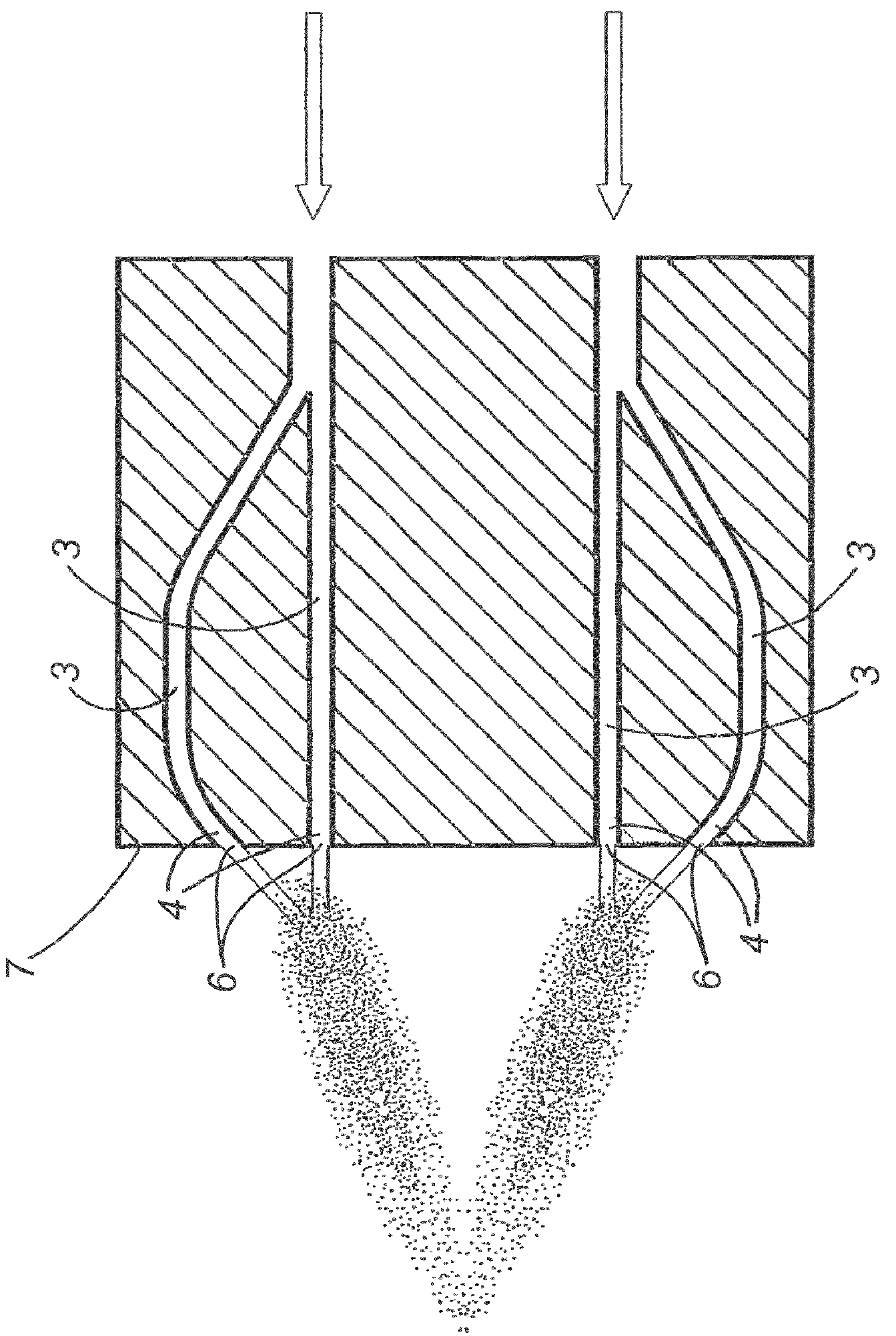
FIG. 5 shows schematically another embodiment of the invention in which the fluid flows through more than two channels.
Figure 6:
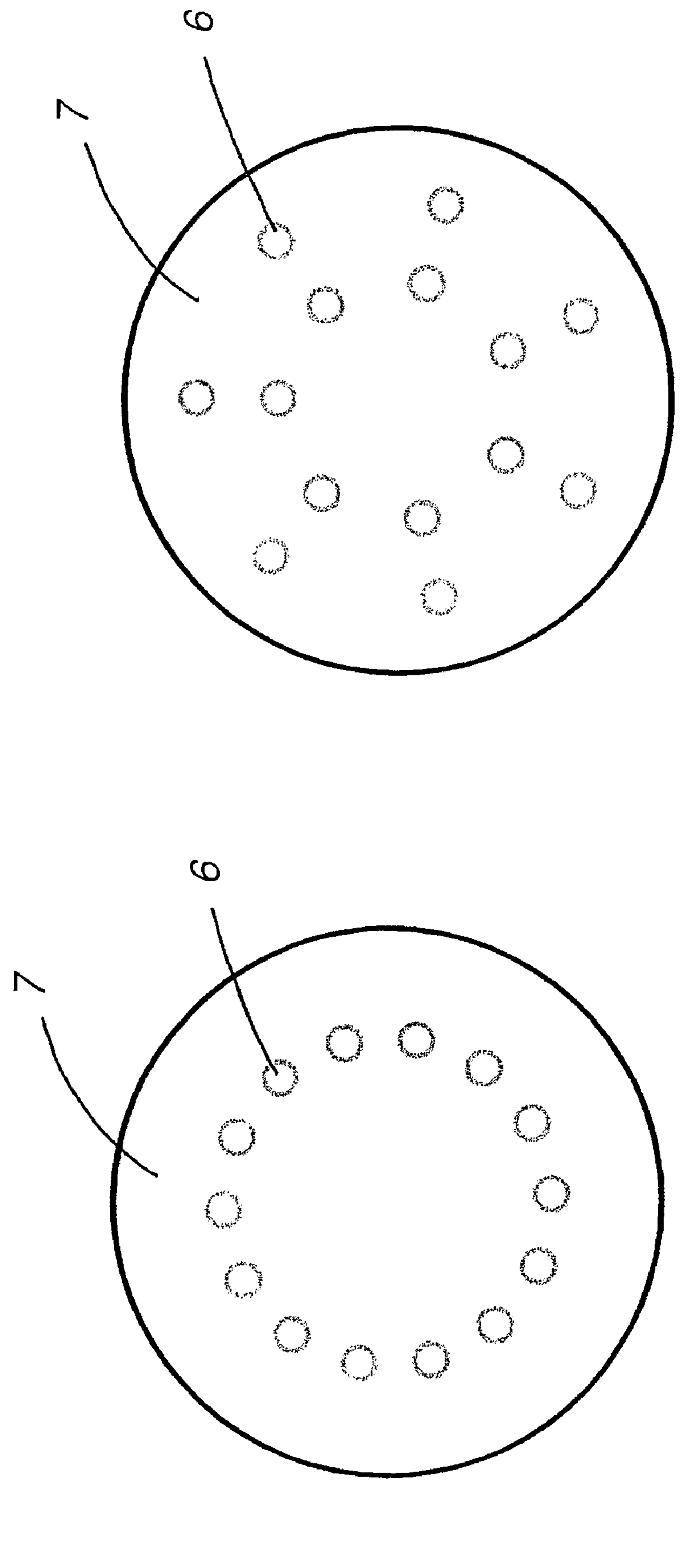
FIG. 6 shows different possible positions of the outlets of the flow channels on the outlet end of the nozzle. The view is towards the outlet end of nozzles according to different embodiments of the invention.

FIG. 5 illustrates schematically an embodiment of the invention comprising four flow channels 3. However, any number of flow channels is possible within the scope of the invention. In the embodiment shown in FIG. 5, the fluid streams impinge on one another pair wise, but streams from three or more outlet flow channels 4 may also impinge. It is also possible to have some of the streams impinging pair wise and others impinging in groups of three or more. In one embodiment of the invention all fluid streams except one impinge the one fluid stream. The nozzle 1 comprising the flow channels 3, 4 may be designed so that the exits 6 of the channels are positioned to enable that the atomization takes place over a larger area than when there are only two exit channels. Two possible designs and amounts of outlets flow channels are illustrated schematically in FIG. 6 which shows the end surface of the nozzle. This may be advantageous for applications in which only one fluid is to be atomized, but the embodiment can also be used to atomize two or more fluids before or at the same time as they are mixed.

The nozzle may be designed so that all the fluid streams impinge with one or more other fluid streams at the same distance from the end surface 7 of the nozzle 1 as shown in FIG. 5. However, it may also be designed to ensure that the fluid streams impinge at different distances from the end surface 7 of the nozzle as illustrated schematically in FIG. 7. This can be obtained both by having different angles or different distances between the outlet flow channels 4 from which the fluid streams impinge as illustrated schematically in FIG. 7. Hereby it may be possible to improve the atomization and/or the mixing of the fluid streams.

Instead of using two or more distinct outlets 6, the outlets may be constituted by an annular/circular slot 8 as shown schematically in FIG. 8. The slot 8 may be provided as a conical bore 9 and a corresponding conical member 10 arranged within the bore. In this embodiment the fluid exiting the slot 8 will exit the nozzle 1 in a tapering conical shape. The conical member 10 may be adjustably arranged so that the longitudinal position of the member can be adjusted whereby the size of the slot 8 can be adjusted. This provides the possibility of adjusting the amount of fluid exiting the nozzle 1.

In a further embodiment, not shown, the nozzle is made of a flexible material. The use of flexible material will provide the effect that the cross sectional area of the outlets will depend on the pressure within the nozzle. The result is that a relatively high pressure will provide a high cross sectional area allowing a relatively large amount of fluid to flow out the outlets. A relatively smaller pressure within the nozzle will provide a relatively smaller cross sectional area allowing a relatively smaller amount of fluid to flow out the outlets. Such a nozzle could preferably be made of a heat resistant material such as silicone.

In a preferred embodiment, not shown, the outlet flow channels are constituted by cannula pipes. These cannula pipes are embedded in for instance a plastic material or are soldered or glued to metal pieces and connected to a feeding channel system feeding fluid to be atomized to the cannula pipes.

Application of nozzles according to the present invention may be done in a number of ways. In particular more than one nozzle may be used to fulfil a given requirement as to fluid to be atomized and as to distribution of the atomized fluid. For instance two nozzles may be arranged so that the atomized fluid from each nozzle streams into each other. Furthermore, two or more nozzles may be used to control the amount of fluid to be atomized by utilising all nozzles at maximum need and turning nozzles off as the need for atomized fluid decreases and turning nozzles on as the need for atomized fluid increases. In such a case the nozzles may be different in the sense that the amount of atomized fluid each nozzle is capable of providing may be different from nozzle to nozzle involved—however, the nozzles may also be identical.

Utilisation of a number of nozzles may increase the reliability for atomizing of fluid for instance in case a nozzle becomes plugged. In such case, the pressure will increase in the remaining nozzles (the nozzles are assumed being connected to the same source of fluid) resulting in that the remaining nozzles will deliver a larger amount of atomized fluid.

Figure 9:
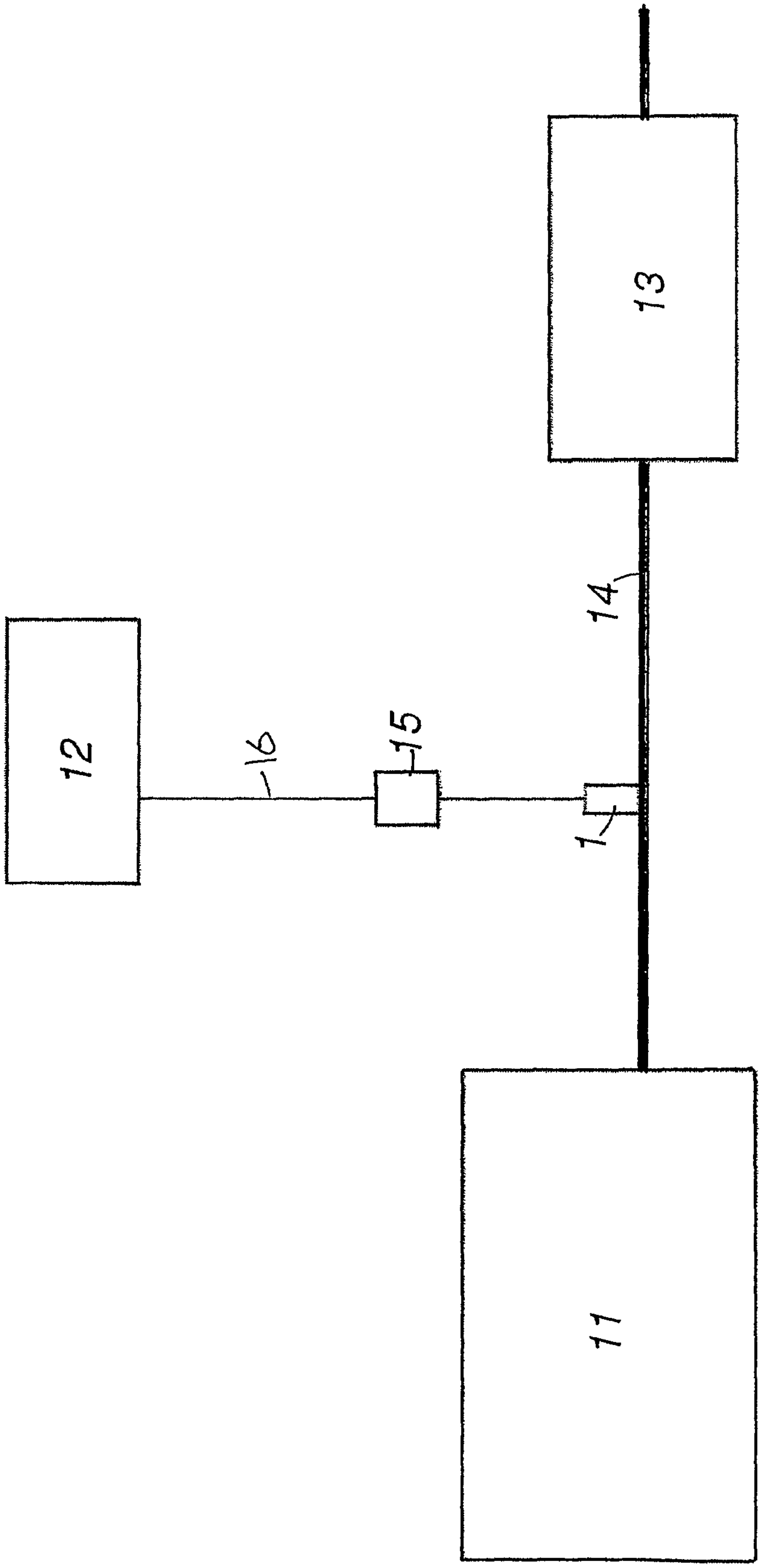
FIG. 9 shows schematically one possible application of the invention, wherein it is used for atomization of urea added to the exhaust gas of a combustion engine or gas turbine.

The present invention may find use in a number of applications in which atomization of a fluid is desired. One such application is for the addition of urea to the exhaust gasses of a combustion engine, such as a Diesel engine as illustrated schematically in FIG. 9. The figure shows a system comprising a combustion engine 11 preferably working according to the Diesel principle, a tank 12 holding a liquid solution of urea (e.g. as known under the trade name AdBlue) and a catalytic system 13. The exhaust of the engine 11 is connected to the catalytic system 13 by an exhaust pipe 14 typically having a diameter of 120 mm which is connected to the tank 12 holding the liquid solution of urea. The system further comprises a metering unit 15 for feeding the urea into the exhaust system so that it may react with the exhaust gasses for minimisation of the discharge of $NO_x$ gasses to the environment. When a nozzle 1 according to the present invention is used to atomize the urea before it is added to the exhaust gasses, the nozzle may be comprised in a separate unit (not shown) mounted after the metering unit 15 at any position along the pipe 16 typically having a diameter of 4 mm leading the urea to the exhaust gas. Alternatively it may be integrated with the metering unit 15.

The unit is preferable placed so that the atomized urea is mixed with the exhaust gas directly after leaving the nozzle 1, and the nozzle is typically arranged so that the fluid exiting the nozzle is sprayed into the stream of exhaust gasses in a stream wise or in any other direction of the exhaust gasses which direction being not necessarily parallel with the stream wise direction of the exhaust gas such as perpendicular to the stream wise direction. The nozzle may be arranged in the centre of a pipe of an exhaust system of a combustion engine or gas turbine and/or in wall of the piping of the exhaust system. A plurality of nozzles may be circumferentially distributed along the wall of a pipe of an exhaust system of a combustion engine. The one or more nozzles may be placed at any position with respect to the pipe of an exhaust system within the scope of the invention.

The nozzle 1 is typically arranged within the exhaust system in such a manner that an even distribution of atomized gas in the exhaust gasses is provided in order to assure that atomized fluid will be distributed evenly within the catalytic system 13. The nozzle may accordingly be arranged in the centre of the piping 14 of FIG. 9 with its outlets facing in the stream wise direction of (but not necessarily parallel with) the exhaust gas.

In order to enhance even distribution of atomized fluid, a plurality of nozzles can be arranged in the exhaust system. Such a plurality of nozzles will preferably be arranged circumferentially and in some cases evenly distributed. However, the nozzles may also be distributed along the stream wise direction of the exhaust gases. The outlets of such nozzles are preferably arranged with the outlets facing in the stream wise direction of (but not necessarily parallel with) the exhaust gas.

It should be noted that a combination of nozzles being arranged circumferentially, in the stream wise direction, and/or one or more nozzles arranged in the centre of the piping is within the scope of the present invention.

The above disclosure has focussed on atomizing urea. However, the invention is applicable of atomizing other fluids as well and in the case of atomizing urea into the exhaust system any fluid which can react in a similar manner as urea with NOx to provide an selective catalytic reduction can be used.

The invention can fitted in or retrofitted in already existing HD-diesel engines or gas engines on trucks, buses, trains, mining equipment, construction equipment, ships airplanes.

The invention claimed is:

1. A method for atomization of one fluid, the method comprising:

providing an exhaust system of a combustion engine or gas turbine;

leading pressurized fluid through two or more outlets of one nozzle, so as to mix the fluid with exhaust gas from the combustion engine or gas turbine, each outlet being defined by the termination of a bore defining an outlet flow channel being in fluid communication with an inlet channel, and each of the two or more outlets having a configuration and an orientation so that fluid streams discharged from the two or more outlets:

have an individual cross sectional area in the range of 0.005 to 0.05 $mm^2$;

form an angle in the range of 70° to 95°; and impinge at a distance from the two or more outlets so as to provide a spray by atomization of the fluid.

2. The method of claim 1, wherein at least one of the two or more outlets is connected to a flow system comprising one or more shut off valves.

3. The method of claim 1, wherein the fluid is led through the two or more outlets intermittently.

4. The method of claim 3, wherein one or more of the two or more outlets is connected to a flow system comprising one or more shut off valves and wherein the intermittent leading of fluid through the two or more outlets is provided by opening and closing the one or more shut off valves.

5. The method of claim 1, wherein the fluid is led through the two or more outlets in a pulsating manner.

6. The method of claim 5, wherein one or more of the two or more outlets is connected to a flow system comprising one or more shut off valves and wherein the pulsating leading of fluid through the one or more outlets is provided by opening and closing the one or more shut off valves.

7. The method of claim 1, wherein the fluid is led through the two or more outlets in a continuous manner.

8. The method of claim 1, wherein the fluid is led to the two or more outlets in a combination of intermittently feeding, pulsating feeding and/or continuously feeding the fluid to the outlets.

9. The method of claim 1, wherein the fluid is led through the two or more outlets in a synchronised manner.

10. The method of claim 1, wherein the fluid streams impinging one another have substantially the same kinetic energy.

11. The method of claim 1, wherein the fluid streams impinging one another have substantially the same mass flow and velocity.

12. The method of claim 1, comprising leading pressurised fluid selectively through some or all outlets of the two or more outlets, in such a manner that the amount of fluid atomized is varied by leading fluid through some or all of the outlets.

13. The method of claim 1, wherein the two or more outlets are arranged so that at least two atomized sprays are provided.

14. The method of claim 13, wherein the at least two atomized sprays are provided by the orientation of the outlets so that they travel in parallel directions.

15. The method of claim 1, wherein the fluid is urea or a fluid which can react in a similar manner as urea with NOx to provide a selective catalytic reduction.

16. A nozzle for atomization of one fluid in an exhaust system of a combustion engine or gas turbine, said nozzle comprising an inlet and two or more outlets, said two or more outlets being arranged in said exhaust system of said combustion engine or said gas turbine so that fluid streams discharged from the two or more outlets impinge at a distance from the two or more outlets, wherein the outlets are defined by the termination of bores each defining an outlet flow channel being in fluid communication with the inlet channel, the outlets being arranged so that the fluid streams discharged from at least two of the two or more outlets impinge each other at an angle of between 70° and 95°, and a cross sectional area of each of the fluid streams discharged from the outlets is in the range of 0.005 to 0.05 $mm^2$.

17. The nozzle of claim 16, wherein the at least two or more outlets comprise three outlets.

18. The nozzle of claim 16, wherein all the outlets are connected to the inlet by intermediate flow channels dividing and leading the fluid entering the nozzle to the outlets.

19. The nozzle of claim 16, wherein the two or more outlets comprise four outlets, wherein two of the four outlets are arranged so that fluid streams discharged there from impinge at first angle and wherein two other outlets of the four outlets are arranged so that fluid streams discharged there from impinge at a second angle, the first and the second angles being different from each other.

20. The nozzle of claim 16, said nozzle further comprising one or more valves arranged to control the flow through the nozzle to accomplish at least one of the following: shut off the nozzle, to provide a pulsating flow of fluid through the nozzle, and provide an intermittent flow of fluid through the nozzle.

21. The nozzle of claim 16, wherein at least a region of the nozzle including the two or more outlets is made of a flexible material.

22. A system for mixing liquid urea or fluid which can react in a similar manner as urea with NOx to provide a selective catalytic reduction of exhaust gasses comprising:

an exhaust system of a combustion engine or gas turbine; and one or more nozzles each comprising an inlet and two or more outlets, said two or more outlets being arranged in said exhaust system of said combustion engine or said gas turbine so that fluid stream(s) discharged from the two or more outlets impinge at a distance from the two or more outlets, wherein the outlets are defined by the termination of bores each defining an outlet flow channel being in fluid communication with the inlet channel, the outlets being arranged so that the fluid streams discharged from at least two of the two or more outlets impinge each other at an angle of between 70° and 95°, and a cross sectional area of each of the fluid streams discharged from the outlets is in the range of 0.005 to 0.05 $mm^2$, and further wherein the one or more nozzles is configured to atomize said urea or fluid which can react in a similar manner as urea with NOx to provide a selective catalytic reduction within the exhaust gasses.

23. The system of claim 22, wherein the one or more nozzles is arranged in the centre of a pipe of the exhaust system of the combustion engine or the gas turbine.

24. The system of claim 22, wherein the one or more nozzles are circumferentially distributed along the wall of a pipe of the exhaust system of a combustion engine or gas turbine.

25. The system of claim 22, wherein the one or more nozzles is arranged so as to deliver atomized fluid in the stream wise direction of the exhaust gasses or in another direction being non-parallel to the stream wise direction.

* * * * *